United States Patent [19]
Yang

[11] Patent Number: 5,358,367
[45] Date of Patent: Oct. 25, 1994

[54] SCREW OR NUT PACKING MICRO-ADJUSTMENT

[76] Inventor: Tai-Her Yang, 5-1 Taipin St. Si-Hu Town, Dzan-Hwa, Taiwan

[21] Appl. No.: 101,757

[22] Filed: Aug. 4, 1993

[51] Int. Cl.⁵ .................. F16B 23/00; F16B 35/06
[52] U.S. Cl. ............................ 411/397; 411/389; 411/432
[58] Field of Search ............ 411/379, 388, 389, 397, 411/432, 374, 916, 917, 383, 384

[56] References Cited

U.S. PATENT DOCUMENTS

| | | | |
|---|---|---|---|
| 2,084,146 | 6/1937 | Key | 411/389 |
| 2,571,265 | 10/1951 | Leufven | 411/917 X |
| 3,130,628 | 4/1964 | Blinn | 411/379 |
| 3,408,887 | 11/1968 | Villo | 411/389 X |
| 4,240,670 | 12/1980 | Zorn et al. | 411/432 X |
| 5,137,408 | 8/1992 | Junkers | |

*Primary Examiner*—Neill R. Wilson
*Attorney, Agent, or Firm*—Bacon and Thomas

[57] ABSTRACT

An improved, elongated threaded fastener is disclosed having a first portion with first threads and an adjacent second portion having second threads. The diameter of the second portion is greater than the diameter of the second portion, while the pitch of the threads on the second portion is less than the pitch of the threads on the first portion. The second portion is also formed with a driver engaging surface to engage a driving tool to apply a rotative force to the threaded fastener. A nut is threaded onto the second end portion to enable the threaded fastener to be utilized for nut packing or micro-adjustment.

6 Claims, 2 Drawing Sheets

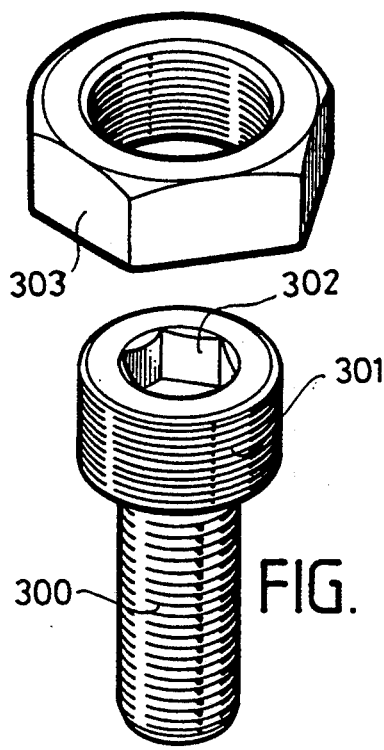
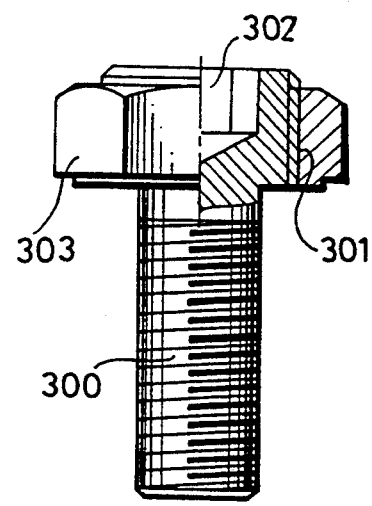
FIG. 3  FIG. 3-1
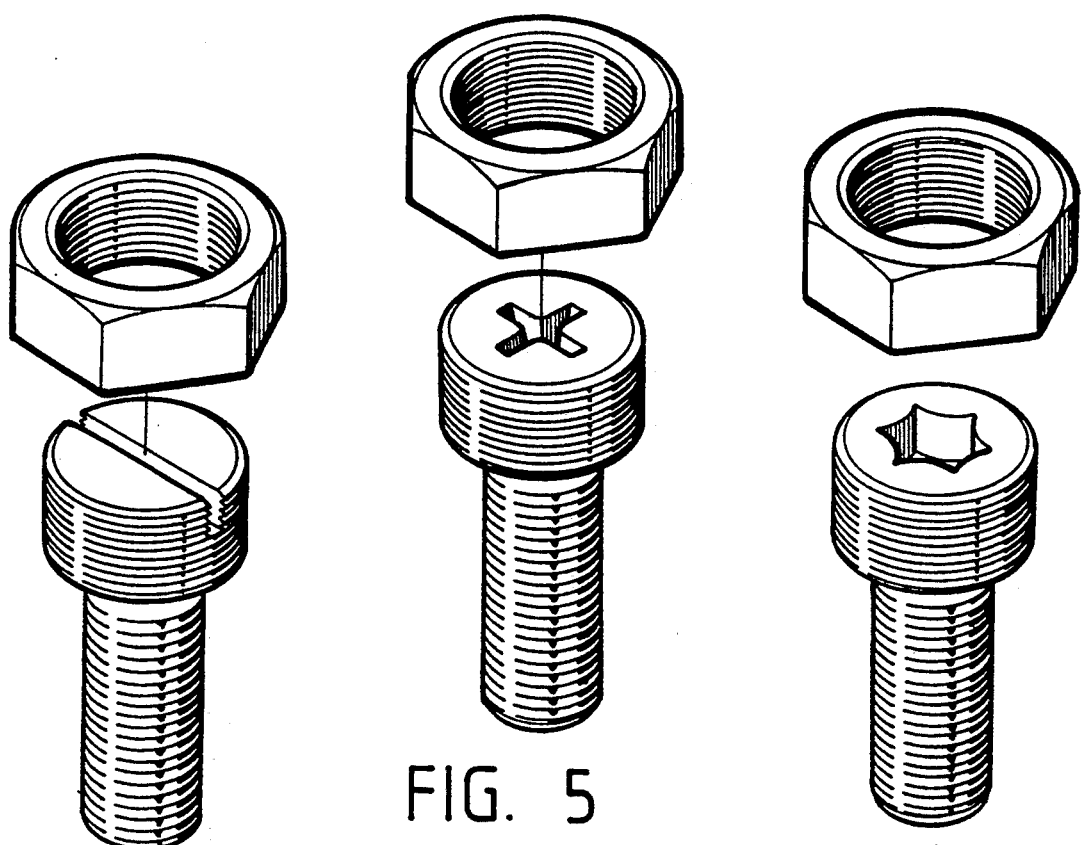
FIG. 4  FIG. 5  FIG. 6

SCREW OR NUT PACKING MICRO-ADJUSTMENT

BACKGROUND OF THE INVENTION

The conventional screw/nut has been widely applied for engaging or packing purposes. It is readily applied for labor-saving and micro-adjusting functions in use.

SUMMARY OF THE INVENTION

The present invention relates to an improvement for a screw or nut for packing or micro-adjustment. More specifically, apart from the internal or external thread on a screw or nut, and the structure for coupling and driving with a tool (such as external polygon, inner polygon, concave teeth or horizontal groove), the present invention has a second thread which gives no interference to the head portion of screw/nut provided for coupling and driving with a tool, such second thread having a smaller pitch than the original thread for engaging with an auxiliary nut to accomplish the packing or micro-adjustment functions.

BRIEF DESCRIPTION OF THE DRAWINGS

FIG. 1-1 is a side view, partially broken away of the device of FIG. 1.

FIG. 2-1 is a side view partially in cross-section of the device of FIG. 2.

FIG. 3 is a third embodiment of the head of a double-thread screw rod in FIG. 1, having an inner-concave and internal hexagon hole.

FIG. 3-1 is a side view, partially in cross-section of the device of FIG. 3.

FIG. 4 is a fourth embodiment of the head of a double thread screw rod in FIG. 1, having a screw groove.

FIG. 5 is a fifth embodiment of the head of a double thread screw rod in FIG. 1, having a cross groove.

FIG. 6 is a sixth embodiment of the head of a double-staircase screw rod in FIG. 1, having a star-shaped groove.

DETAILED DESCRIPTION OF THE PREFERRED EMBODIMENTS

The present invention relates to an improvement for a screw or a nut for packing or for micro-adjustment. More specifically, apart from the internal or external thread on a screw or nut, and the structure for coupling and driving with a tool (such as external polygon, inner polygon, concave teeth or horizontal groove), the present invention has a second thread which gives no interference to the head portion of the screw/nut provided for coupling and driving with a tool, such second thread having a smaller pitch than the main thread for engaging with an auxiliary nut to accomplish the packing or micro-adjustment functions.

Based on the foregoing principle, the present invention can be widely applied to an external polygon screw/nut, an internal hexagon screw, a cross-grooved, split headed, or star-shaped screw head with an inner-concave coupling structure. Related embodiments are described as follows.

Figure 1:
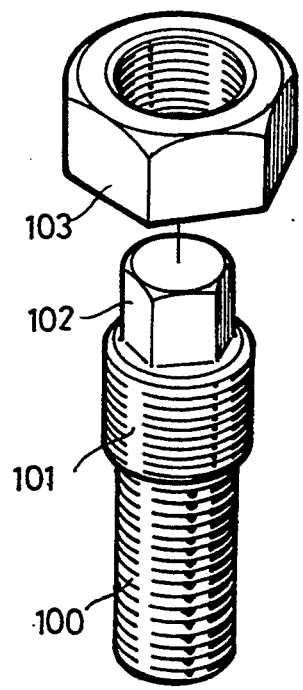
FIG. 1 is a first embodiment showing a screw with external hexagon head provided with a thread having a smaller pitch for packing or micro-adjustment and the application of packing nut.
Figure 1:
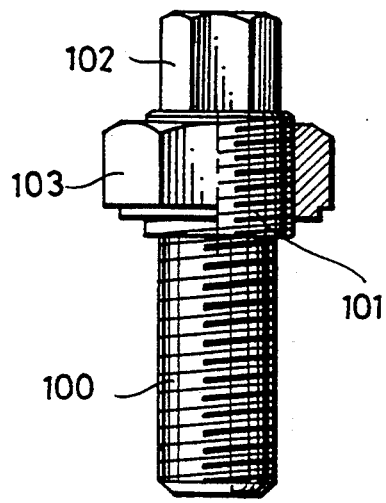

Referring to FIGS. 1 and 1-1, the embodiment showing a screw with external hexagon head is provided with a second thread having a smaller pitch for packing or micro-adjustment and the application of packing nut wherein screw body 100 having a main thread, a threaded portion 101 with greater diameter and having a second thread with a smaller pitch than the main thread for packing or micro-adjustment, and a hexagon nut 102 extending upwardly. The outside diameter of hexagon nut 102 may be greater, smaller or equivalent to the aforesaid packing or micro-adjustment portion 101 with the smaller pitch thread.

A second nut 103 with a packing or micro-adjustment threaded portion having the smaller pitch, is provided for engagement with the aforesaid packing or micro-adjustment portion 101 having the smaller pitch thread.

With the aforesaid main thread fit into the tapped hole, up the second nut 103 may be engaged with portion 101 for a packing screw or micro-adjustment screw.

Figure 2:
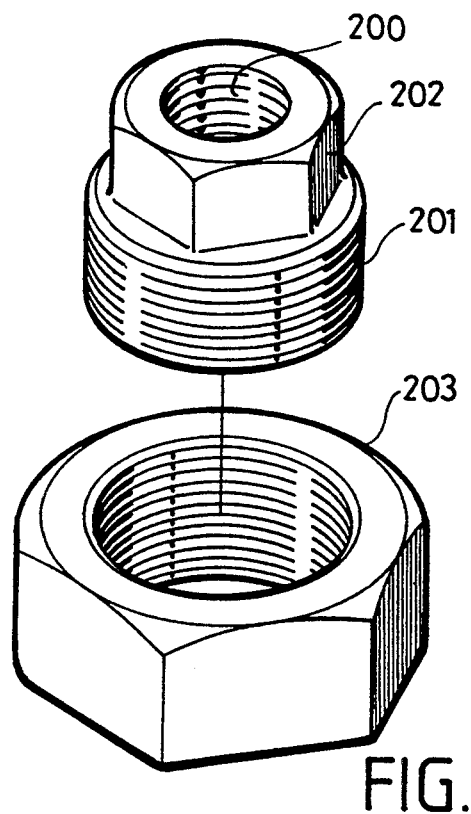
FIG. 2 is a second embodiment of a direct packing nut.
Figures 1, 2:
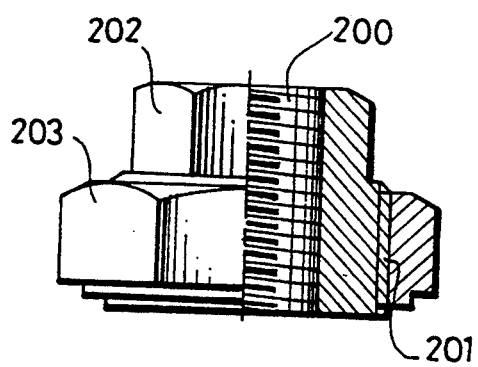

Referring to FIGS. 2 and 2-1, the embodiment of a direct packing nut and characteristics of structure can be seen.

The outer circumference of nut 202 has a polygon shape (at least two faces) provided for driving, and an inner hole having a main internal thread 200 for coupling with a screw rod. A lower side with an auxiliary portion made in greater (or smaller) diameter has a thread 201 with a smaller pitch to fit an auxiliary nut 203 having a thread with the smaller pitch.

Referring to FIGS. 3 and 3-1, the embodiment of the head of double-thread screw rod in FIG. 1, having inner-concave and internal hexagon hole screw wherein the hexagon head in FIG. 1 is replaced by inner hexagon hole 302 to be driven with a hexagon wrench. Related thread 301 and auxiliary nut 303 for packing and adjustment are the same as shown in FIG. 1.

Referring to FIG. 4, the embodiment of the head of double-thread screw rod in FIG. 1, has a groove for engagement with a single-bladed screwdriver. The structures of the threads and auxiliary nut for packing and adjustment are the same as shown in FIG. 1.

Referring to FIG. 5, the embodiment of the head of double-thread screw rod in FIG. 1, has a cross groove, for an engagement with a cross bladed screwdriver. The structure of the threads and auxiliary nut for packing and adjustment are the same as shown in FIG. 1.

Referring to FIG. 6, the embodiment of the head of double-thread screw rod in FIG. 1, has a star recess for engagement with a star-type screwdriver, the structure of the threads and auxiliary nut for packing and adjustment are the same as shown in FIG. 1.

The aforesaid embodiments use a hexagon screw head or nut only for the purpose of explanation. It is to be understood, that the present invention can also be used with a driving/coupling portion of screw head, an inner hole or an auxiliary nut having any geometric shape.

To conclude the above statement, the present invention has provided a simple specified packing and adjusting screw with convenience of operation, and such structure is simple and practical and originally created.

I claim:

1. An elongated threaded fastener comprising:
   a) a generally cylindrical first portion having an external surface with first threads formed thereon, the first threads having a diameter $d_1$ and a pitch $p_1$;

b) a generally cylindrical second portion located adjacent to the first portion, the second portion having an external surface with second threads formed thereon, the second threads having a diameter $d_2$ such that $d_2 > d_1$ and a pitch $P_2$ such that $P_2 < P_1$;

c) drive means formed on the second portion and configured to engage a driving tool to apply a rotative face to the threaded fastener; and, d) a nut threadingly engaged with the threads on the second portion.

2. The thread portion of claim 1 wherein the drive means comprises an extension extending from the second portion, the extension having a polygonal cross-sectional configuration.

3. The threaded fastener of claim 1 wherein the drive means comprises a recess defined by the second portion, the recess having a polygonal cross-sectional configuration.

4. The threaded fastener of claim 1 wherein the drive means comprises a groove extending across the second portion.

5. The threaded fastener of claim 1 wherein the drive means comprises a generally cruciform shaped recess.

6. The threaded fastener of claim 1 wherein the drive means comprises a recess defined by the second portion, the recess having a plurality of convex walls.

* * * * *